United States Patent Office 2,975,193
Patented Mar. 14, 1961

2,975,193

ORGANIC AMINE COMPOUNDS AND METHOD OF OBTAINING THE SAME

John R. Dice, Grosse Pointe Woods, Mich., and Dolores V. Lopiekes, Bridgewater, Mass., assignors to Parke, Davis & Company, Detroit, Mich., a corporation of Michigan No Drawing. Filed June 18, 1959, Ser. No. 821,123

8 Claims. (Cl. 260—326.5)

This invention relates to certain pyrrolidine compounds and to methods for obtaining the same. More particularly, the invention relates to 3-phenyl pyrrolidines and acid salts thereof which in free base form may be represented by the formula

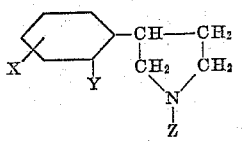

where X represents hydrogen or a chlorine atom or an alkoxy group containing from one to five carbon atoms, X being substituted at either the 3- or 5-phenyl position, Y represents a chlorine or bromine atom or an alkyl, alkoxy, alkenyloxy or alkylmercapto group containing from one to five carbon atoms, and Z represents an alkyl or hydroxyalkyl radical containing from two to six carbon atoms, Y being limited to an alkoxy, alkenyloxy or alkylmercapto group containing one to five carbon atoms when Z represents an alkyl group.

In accordance with one embodiment of the invention, the products are produced by reducing an α-phenyl-N-substituted succinimide having the formula

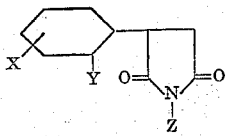

where X and Y have the above-mentioned significance and Z represents an alkyl or hydroxyalkyl radical containing from two to six carbon atoms. The reduction can be conveniently accomplished with various reducing agents such as gaseous hydrogen under pressure or complex metal hydrides. Reduction with a complex metal hydride is carried out in an inert, anhydrous solvent such as ether, tetrahydrofuran and the like. The use of lithium aluminum hydride is preferred. The concentration of lithium aluminum hydride can be varied considerably and for best results from 3 to 6 equivalents are employed with from 1 to 2 liters of solvent per mole of hydride. The temperature of the reaction is likewise subject to considerable variation. Conveniently, the reaction employing a hydride reductant is carried out at a temperature in the range from 0° C. to the boiling point of the solvent employed. As indicated, reduction in accordance with the invention can be accomplished by means of gaseous hydrogen under elevated temperature and pressure in the presence of an inert organic solvent and a suitable hydrogenation catalyst. Preferably, a copper chromite catalyst is employed at temperatures in excess of 80° C. and at hydrogen pressures in excess of 100 lbs. per sq. inch. As solvents, ether, tetrahydrofuran, dioxane and the like may be used.

According to another embodiment of the invention, the products are produced by reducing a 1-alkyl-3-phenyl-3-hydroxypyrrolidine

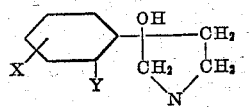

or a 1-alkyl-3-phenyl-Δ²-pyrrolenine

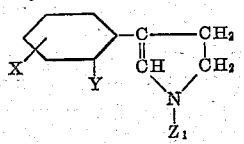

where X and Y have the above-mentioned significance and $Z_1$ is an alkyl group containing from two to six carbon atoms. The reduction is carried out with gaseous hydrogen in the presence of a hydrogenation catalyst. As hydrogenation catalysts, palladium, palladium on charcoal, platinum and the like are particularly useful. The temperature and hydrogen pressures used in carrying out the process are not critical. Temperatures in excess of room temperature are satisfactory and hydrogen pressures varying from 3 to 4 atmospheres and upward can be used. An inert organic solvent such as ether, tetrahydrofuran, dioxane and the like, is used for the reaction.

In still another embodiment the products are produced by reacting a 3-phenylpyrrolidine of formula

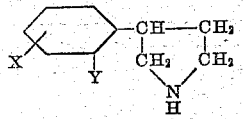

where X and Y have the above-mentioned significance, with a reactive derivative of an alkyl or omega-hydroxyalkyl compound containing from two to six carbon atoms. In one variation of this embodiment an alkyl halide, sulfate or sulfonate or an omega-alkanol halide, sulfate or sulfonate can be employed as the reactive derivative. The reaction is carried out by contacting the reactants, conveniently in the presence of an anhydrous organic solvent. Among the various solvents suitable for the purpose may be mentioned hydrocarbons such as benzene, toluene, xylene and the like; low boiling alcohols such as methanol, isopropanol and the like; and low boiling ketones such as acetone, methyl ethyl ketone and the like. Although the relative proportions of the reactants may be varied, it is preferable to employ about two equivalents of the 3-phenylpyrrolidine for each equivalent of the mentioned reactive derivative. The temperature of the reaction is not particularly critical. Temperatures in excess of 30° C. up to about 175° C. are preferred. Conveniently, the reaction is carried out at the reflux temperature of the reaction mixture. The reaction can also be carried out employing as the reactive derivative an omega-acyloxyalkyl halide, sulfate or sulfonate containing from two to six alkyl carbon atoms in the manner indicated above, in which case the resulting 3-phenyl-N-acyloxyalkylpyrrolidine product is then subjected to hydrolysis or alcoholysis to the corresponding 3-phenyl-N-(omega-hydroxy)-alkylpyrrolidine. Hydrolysis can be conveniently carried out with an aqueous alkali metal hydroxide or alkaline earth metal hydroxide in an inert organic solvent such as a lower aliphatic alcohol or ketone. Alcoholysis can be carried out with catalytic amounts of an alkali metal alcoholate in an anhydrous organic solvent such as a lower aliphatic alcohol. Alcoholysis or hydrolysis, as the case may be, can be effected over a wide temperature range but is preferably carried out at the boiling point of the reaction mixture. Also, the reaction can be carried out employing as the reactive derivative a straight chain aliphatic carboxylic acid or halide, ester or anhydride thereof, or the corresponding omega-hydroxy straight chain aliphatic carboxylic acid esters or omega-carboalkoxy acyl halides, the acyl portion of the reactive derivative containing from two to six carbon atoms. The reaction is carried out in the same manner indicated above and the reaction product is subsequently reduced. Reduction can be carried out in accordance with the invention in a number of different ways, preferably by catalytic means employing gaseous hydrogen and a metal catalyst such as copper chromite, or by chemical means employing metallic sodium and an alcohol or a complex oxidizable metal hydride such as lithium aluminum hydride. In carrying out the reduction with gaseous hydrogen a copper chromite catalyst is employed in the presence of an inert organic solvent, preferably at hydrogen pressure of about 200 to 300 p.s.i. Solvents which can be used for the reaction include lower aliphatic alcohols and cyclic aliphatic ethers. Some examples of these solvents are methanol, ethanol, n-propanol, isopropanol, dioxane and the like. Reduction with lithium aluminum hydride is accomplished in an anhydrous non-hydroxylic organic solvent. Some examples of suitable solvents are diethylether, di-isopropylether, dioxane, tetrahydrofuran, ethylene glycol dimethyl ether and ethylene glycol diethyl ether. Preferably, lithium aluminum hydride is employed in excess of the theoretical amount required. Best results are obtained by combining the reactants slowly. The temperature during the reduction is not particularly critical; the optimum temperature is in the range from about 15 to 35° C. Reduction with sodium metal in the presence of alcohol is accomplished preferably at the reflux temperature of the reaction mixture. Some examples of suitable alcohols are methanol, ethanol, n-propanol, isopropanol, n-butanol and the like. For best results sodium is employed in excess of the theoretical amount required. Likewise, ethylene oxide can be employed as the reactive derivative and the reaction carried out with the 3-phenylpyrrolidine at temperatures ranging from 10 to 80° C., thereby leading to the corresponding 3-phenyl-N-(2-hydroxyethyl)-pyrrolidine.

As indicated above the products of the invention occur in both the free base and acid salt forms. In some instances it will be desirable to obtain the acid salt from the free base. In this case the salt can be prepared by reacting the free base with the corresponding acid in the presence of a suitable organic solvent in which the intended salt is insoluble, permitting isolation of the salt by filtration, decantation, or other suitable means. On the other hand in those instances where it is desired to convert the acid salt to the free base, the same can be accomplished by dissolving the salt in a suitable solvent such as water, methanol, etc., neutralizing the solution with a basic material such as sodium hydroxide, ammonium hydroxide, alkali metal carbonate and the like and isolating the desired base by extraction or other suitable means.

The products of the invention have been found to possess outstanding activity in depressing the central nervous system; consequently, they have application, when administered parenterally in suitable dosage form, in the treatment of hypertension, nausea and similar conditions. Among the products of the invention, the ortho-substituted phenyl hydroxypentyl pyrrolidines are preferred as a class because of significantly higher activity with respect to the lowering of blood pressure and depression of the central nervous system.

The invention is illustrated by the following examples.

*Example 1*

(a) To a stirred solution of 500 g. of o-methoxy-benzaldehyde and 256 g. of ethyl cyanoacetate in 500 ml. of ethanol is added 3 ml. of piperidine. The mixture is stirred for approximately two hours and then cooled. The precipitate, which is ethyl α-cyano-o-methoxycinnamate, M.P. 73–75° C., is removed by filtration and dried. 220 g. of potassium cyanide is added portion-wise over a period of 20 minutes to a stirred solution of 310 g. of ethyl α-cyano-o-methoxycinnamate in 500 ml. of ethanol. The reaction mixture is heated to reflux temperature, cooled and diluted with 2 to 4 volumes of water. The mixture is made acid to congo red with concentrated hydrochloric acid and the resulting oil is recovered and separated. The oily product, ethyl α,β-dicyano-β-o-methoxyphenylpropionate, is refluxed with 700 ml. of concentrated hydrochloric acid until solution is complete. The reaction mixture is then cooled and the product is removed by filtration and dried. This product is o-methoxyphenylsuccinic acid, M.P. 168–170° C.

(b) 100 g. of o-methoxyphenylsuccinic acid is added to a solution of 75 g. of ethanolamine in 100 ml. of water. The reaction mixture is placed in a distillation apparatus and heated over a metal bath, until the temperature reaches 240° C. The distillate up to this point is collected and discarded. The residue is then distilled in vacuo to give α-(o-methoxyphenyl)-N-hydroxyethylsuccinimide, B.P. 150–180° C. at 0.05–0.2 mm.

(c) Approximately 53 g. of α-(o-methoxyphenyl)-N-hydroxyethylsuccinimide is mixed with 100 ml. of acetyl chloride and allowed to stand for 24 hours to form the acetate. The excess acetyl chloride is removed by distillation in vacuo and the residue dissolved in tetrahydrofuran. This solution is added to a stirred slurry of 40 g. of lithium aluminum hydride and one liter of dry ether. Following complete addition of the reactant, the solution is stirred for six hours at room temperature.

(d) The excess lithium aluminum hydride is then decomposed by adding four ml. of water per .01 mole of lithium aluminum hydride dropwise. The reaction mixture is then made strongly alkaline with concentrated sodium hydroxide solution or sodium hydroxide pellets. The ether layer is removed and extracted four times with equal volumes of 2 normal hydrochloric acid. The collected hydrochloric acid layers are then made basic with dilute sodium hydroxide and this solution is extracted four times with equal volumes of ether. The ether layers are dried over anhydrous magnesium sulfate which is removed by filtration and the ether is evaporated to give an oil. The residual oil is distilled in vacuo to give 3-(o-methoxyphenyl)-N-(2-hydroxyethyl)-pyrrolidine, B.P. 130–140° C. at 0.25 to 0.3 mm. of mercury.

*Example 2*

(a) 100 g. of o-methoxyphenylsuccinic acid is mixed with a solution of 75 g. of 3-aminopropanol in 100 ml. of water. This mixture is placed in a distillation flask and heated over a metal bath until the temperature rises to 240° C. The distillate is collected and discarded. After the temperature reaches 240° C. and no further distillate is collected, the residue is distilled in vacuo to give α-(o-methoxyphenyl)-N-(3-hydroxypropyl)succinimide, B.P. 150–160° C. at 0.1 mm. of mercury.

(b) 77 g. of α-(o-methoxyphenyl)-N-(3-hydroxypropyl)-succinimide is mixed with 100 ml. of acetyl chloride and allowed to stand for 24 hours to form the acetate. The excess acetyl chloride is distilled in vacuo and the residue is dissolved in 200 ml. of tetrahydrofuran. This solution is added to a stirred slurry of 40 g. of lithium aluminum hydride in one liter of anhydrous ether. Following the complete addition of the reactant, the solution is stirred for six hours at room temperature. The reaction mixture is then decomposed with water, extracted and the extracts distilled as in Example 1(d). The residual oil which is distilled in vacuo gives 3-(o-methoxyphenyl)-

N-(3-hydroxypropyl)pyrrolidine, B.P. 128–140° C. at 0.15 to 0.2 mm.

Example 3

100 g. of o-methoxyphenylsuccinic acid is added to a mixture of 75 g. of 5-amino-1-pentanol in 100 ml. of water. The mixture is placed in a distillation set-up and gradually heated to 250° C., the distillate being collected and discarded. When the temperature reaches 250° C. the residue remaining in the flask is distilled in vacuo to give α-(o-methoxyphenyl)-N-(5-hydroxypentyl)succinimide, B.P. 200–240° at 0.1 to 0.3 mm.

108 g. of α-(o-methoxyphenyl)-N-(5-hydroxypentyl)-succinimide is then treated with 200 ml. of acetyl chloride as in Example 1(c). The product consisting of α-(o-methoxyphenyl)-N - (5-acetoxypentyl)succinimide is then reduced with 40 g. of lithium aluminum hydride in 2 liters of anhydrous ether as in Example 1(c). The reaction mixture is treated with water, extracted and the extracts distilled as in Example 1(d), and the product is distilled in vacuo to yield 3-(o-methoxyphenyl)-N-(5-hydroxypentyl)pyrrolidine, B.P. 175–180° C. at 1.5 mm.

Example 4

(a) To a mixture of 472 g. of n-propylamine in 1000 ml. of absolute alcohol are added, with stirring, over a period of about one hour, 344 g. of methyl acrylate. The reaction mixture is heated to 60° for 18 hours, and the alcohol and excess amine removed under reduced pressure at 60° C. The product is N-(n-propyl)-β-alanine methyl ester. This residue is taken up in 1000 ml. of dry benzene and treated with 334 g. of ethyl bromoacetate. The mixture is stirred well and allowed to stand for 16 hours at room temperature. The mixture is stirred and refluxed for two hours, cooled and the solid removed by filtration. The solid is washed well with benzene and the washings are added to the filtrate. The solution, containing N-(n-propyl)-N-carbethoxymethyl-β-alanine methyl ester, is diluted to about 1000 ml. with dry benzene and added to a mixture of 129.6 g. of sodium methoxide in 1000 ml. of dry benzene. The resulting reaction mixture is refluxed for two hours, the alcohol being removed by azeotropic distillation as it is formed. After approximately one quarter of the solvent has been removed, stirring is stopped and the remainder of the solvent is removed by distillation in vacuo to obtain a thick residue of N-(n-propyl)-4-carbethoxy-3-pyrrolidone. This residue is warmed with two liters of 3-normal hydrochloric acid and then refluxed for 18 hours. The reaction mixture is cooled and then made basic with sodium hydroxide and the resulting solution is cooled and extracted four times with equal volumes of ether. The ether extracts are dried over magnesium sulfate, filtered and the ether removed by distillation. The residue is distilled in vacuo to give N-(n-propyl)-3-pyrrolidone.

(b) 112 g. of o-bromoanisole in 250 ml. of dry ether is added to a mixture of 8.4 g. of lithium wire covered with 150 ml. of dry ether. The reaction mixture is stirred for one hour after the addition of the o-bromoanisole. To the stirred lithium reagent is added a solution of 50 g. of N-(n-propyl)-3-pyrrolidone in 250 ml. of dry ether at a rate such that gentle refluxing occurs. The reaction mixture is then heated at a refluxing temperature for three hours, allowed to stand at room temperature for 16 hours and poured onto ice. The basic solution is extracted four times with ether and the ether extracts combined, dried and evaporated. The residue is distilled in vacuo to give N-(n-propyl)-3-hydroxy-3-o-methoxyphenyl pyrrolidine.

(c) A solution of 17.5 g. of N-(n-propyl)-3-o-methoxyphenyl-3-hydroxypyrrolidine in 150 ml. of 98–100% formic acid is heated to reflux temperatures for six hours. Approximately 80 ml. of the formic acid is removed by distillation and the residue is poured into 250 ml. of water. This aqueous solution is made basic with sodium hydroxide, cooled and extracted three times with equal volumes of ether. The ether solution is washed with 5% sodium hydroxide solution in water, then dried and evaporated. The residue is distilled in vacuo to give N-(n-propyl)-3-o-methoxyphenyl-Δ²-pyrrolenine.

28 g. of N-(n-propyl)-3-o-methoxyphenyl-Δ²-pyrrolenine is dissolved in 200 ml. of glacial acetic acid. 10 g. of 10% palladium on charcoal is added and the reaction mixture reduced with hydrogen under atmospheric pressure until the theoretical amount of hydrogen is taken up. The reaction mixture is filtered, the glacial acetic acid is removed by distillation in vacuo and the residue is distilled in vacuo to give 3-o-methoxyphenyl-N-(n-propyl)-pyrrolidine.

(d) Alternatively the product of (c) can be made as follows:

23.7 g. of N-(n-propyl)-3-hydroxy-3-o-methoxyphenyl pyrrolidine is dissolved in 200 ml. of glacial acetic acid. 5 g. of 10% palladium on charcoal is added and the reaction mixture is reduced with hydrogen at two atmospheres pressure. When the theoretical amount of hydrogen is taken up the reaction mixture is filtered and the residue is distilled in vacuo to remove the acetic acid and further distilled in vacuo to give 3-o-methoxy-N-(n-propyl)-phenylpyrrolidine.

Example 5

(a) To a stirred solution of 668 g. of 2,3-dimethoxybenzaldehyde and 452 g. of ethyl cyanoacetate in 200 ml. of absolute ethanol is added two ml. of piperidine. The reaction mixture is allowed to warm and then is cooled, the precipitate is removed by filtration and washed with ethanol; the product is ethyl α-cyano-2,3-dimethoxyphenylcinnamate, M.P. 117–119° C.

(b) To a stirred mixture of 500 g. of ethyl α-cyano-2,3-dimethoxycinnamate and 800 ml. of ethanol is added 276 g. of potassium cyanide over a period of 20 minutes. This solution is heated to reflux, cooled and diluted with two liters of water and a solid precipitates. This solid is removed by filtration and is refluxed with one liter of concentrated hydrochloric acid for 42 hours, cooled, and the aqueous layer is removed. The resulting oily product is then dissolved in a solution of 167 g. of sodium hydroxide in 1.7 liters of water, charcoaled and filtered. The filtrate is made acid, and cooled. The dark oil which forms is separated by decantation, is taken up in 200 ml. of acetic anhydride and allowed to stand for one to three days. The solid precipitate is removed by filtration and purified by alternately dissolving in base and reprecipitating with acid to give yellow crystals of 2,3-dimethoxyphenylsuccinic acid, M.P. 155–157° C.

(c) 50 g. of 2,3-dimethoxyphenylsuccinic acid is added to a mixture of 25 g. of 5-amino-1-pentanol and 100 ml. of water in a distillation set-up. The reaction mixture is gradually heated to 250° C., with the distillate being collected and discarded. The residue is crude α - (2,3 - dimethoxyphenyl) - N - (5 - hydroxypentyl)-succinimide.

(d) 10 g. of α-(2,3-dimethoxyphenyl)-N-(5-hydroxypentyl)succinimide is mixed with 3 g. of dihydropyran and 2 drops of concentrated hydrochloric acid. This mixture is allowed to stand for three hours with occasional shaking. 200 ml. of ether is added and the solution is dried with anhydrous magnesium sulfate and filtered. The filtrate which contains the tetrahydropyranyl ether of α-(2,3-dimethoxyphenyl)-N-(5-hydroxypentyl)-succinimide is then added to a stirred slurry of 4 g. of lithium aluminum hydride in 100 ml. of ether and stirred for six hours at room temperature. The reaction mixture is treated with water, extracted and concentrated as in Example 1(d). The product is 3-(2,3-dimethoxyphenyl)-N-(5-hydroxypentyl)-pyrrolidine.

Example 6

(a) To a stirred solution of 367 g. of 2,5-dimethoxybenzaldehyde and 339 g. of ethyl cyanoacetate in one liter of ethanol is added 2 ml. of piperidine. The temperature rises to approximately 35° C. and the solution is allowed to stand for one hour. The reaction mixture is cooled and the orange precipitate is removed by filtration and washed with ethanol. The product is ethyl α-cyano-2,5-dimethoxycinnamate, M.P. 83–85° C.

(b) 170 g. of potassium cyanide is added portionwise over a period of 20 minutes to a stirred solution of 364 g. of ethyl α-cyano-2,5-dimethoxycinnamate in 500 ml. of ethanol. After the addition, the solution is heated for 10 minutes, cooled and diluted with one liter of water. The mixture is acidified with concentrated hydrochloric acid to congo red and a solid precipitate forms. The solid is removed by filtration and refluxed with one liter of concentrated hydrochloric acid for nine hours. The solution is cooled and filtered. The filter cake is dissolved in a solution of 100 g. of sodium hydroxide in one liter of water. This solution is charcoaled, filtered and made acid to congo red with concentrated hydrochloric acid. The mixture is cooled and the product is removed by filtration. The product is crude 2,5-dimethoxyphenylsuccinic acid. This crude 2,5-dimethoxyphenylsuccinic acid is added to 90 g. of 5-amino-1-pentanol in 100 ml. of water. The mixture is placed in a distillation set-up and gradually heated to 240° C., the distillate being collected and discarded. The residue is then distilled in vacuo to give α-(2,5-dimethoxyphenyl)-N-(5-hydroxypentyl)succinimide, B.P. 215–230° C. at 0.3 mm.

(c) 137 g. of the α-(2,5-dimethoxyphenyl)-N-(5-hydroxypentyl)succinimide is treated with 100 ml. of acetyl chloride as shown in Example 1(c). The residue is dissolved in 500 ml. of dry ether and added slowly to a slurry of 50 g. of lithium aluminum hydride and two liters of dry ether. Following complete addition, the mixture is stirred for six hours and then decomposed and extracted as shown in Example 1(d). The residue is distilled in vacuo to give 3-(2,5-dimethoxyphenyl)-N-(5-hydroxypentyl)-pyrrolidine, B.P. 160–170° C. at 0.2 mm.

*Example 7*

(a) One ml. of piperidine is added to a stirred solution of 200 g. of o-ethoxybenzaldehyde and 102.4 g. of ethyl cyanoacetate in 400 ml. of ethanol. The reaction is allowed to stand for one hour and then cooled and filtered. The yellow precipitate is washed with ethanol and is air-dried. The product is ethyl α-cyano-o-ethoxycinnamate, M.P. 68–70° C.

(b) To a stirred mixture of 286.3 g. of ethyl α-cyano-o-ethoxycinnamate in 471 ml. of ethanol is added 152 g. of potassium cyanide portionwise over a period of 20 minutes. Following complete addition, the mixture is heated for 10 minutes, cooled and diluted with approximately 750 ml. of water. The solution is made acid to Congo red with concentrated hydrochloric acid. A red oil precipitates; this oil is decanted from the solution and refluxed with 1.2 liters of concentrated hydochloric acid for nine hours. This solution is cooled and filtered. The filter cake is dissolved in a solution of 100 g. of sodium hydroxide in one liter of water, charcoaled and filtered. The filtrate is made acid to Congo red with concentrated hydrochloric acid. The acid solution is cooled and the precipitate removed by filtration. The product is o-ethoxyphenylsuccinic acid, M.P. 178–180° C.

(c) 100 g. of o-ethoxyphenylsuccinic acid is added portionwise to a solution of 75 g. of 5-amino-1-pentanol in 100 ml. of water. This mixture is placed in a distillation set-up and heated gradually to 250° C. The distillate is collected and discarded and the residue is further distilled in vacuo. The product is α-(o-ethoxyphenyl)-N-(5-hydroxypentyl)-succinimide, B.P. 200–205° at 0.1 mm.

(d) 65 g. of the aceate of the α-(o-ethoxyphenyl)-N-(5-hydroxypentyl) succinimide described above is formed by dissolving the succinimide in 100 ml. of acetyl chloride and holding the solution for 24 hous. The excess acetyl chloride is removed in vacuo and the residue is taken up in 500 ml. of ether. The solution is added to a stirred slurry of 28.5 g. of lithium aluminum hydride in two liters of dry ether. Stirring is continued for six hours and then the reaction mixture is decomposed and the product is obtained as in Example 1 (d). The crude product is distilled in vacuo to give 3-(o-ethoxyphenyl)-N-(5-hydroxypentyl)pyrrolidine, B.P. 158–160° C. at 0.3 mm.

*Example 8*

(a) To a stirred solution of 279 g. of o-n-propoxynenzaldehyde and 264 g. of ethyl cyanoacetate in 100 ml. of absolute ethanol is added 2 ml. of piperidine. The reaction mixture is allowed to stand for two to three hours, cooled and the precipitate removed by filtration and dried. The product is ethyl α-cyano-o-propoxycinnamate, M.P. 60–62° C.

(b) 126 g. of potassium cyanide is added portionwise to a stirred mixture of 376 g. of ethyl-α-cyano-o-n-propoxycinnamate in 500 ml. of ethanol. After complete addition the solution is heated to reflux temperature, cooled and diluted with two volumes of water. The mixture is acidified to Congo red with concentrated hydrochloric acid. The solid is removed by filtration and is refluxed for ten hours in one liter of concentrated hydrochloric acid, is then cooled and the oily product harvested by decantation. This brown oil is further purified by solution in dilute sodium hydroxide solution and reprecipitation with hydrochloric acid and then recrystallization from benzene. The product is o-n-propoxyphenylsuccinic acid, M.P. 149–151° C.

(c) 100 g. of the o-n-propoxyphenylsuccinic acid is dissolved in a solution of 75 g. of 5-amino-1-pentanol in 100 ml. of water. This mixture is placed in a distillation apparatus and gradually heated to 240° C. The distillate is collected and discarded. The residue is distilled in vacuo to give α-(o-n-propoxyphenyl)-N-(5-hydroxypentyl)succinimide, B.P. 197–210° C. at 0.2 mm.

(d) 20 g. of the α-(o-n-propoxyphenyl)-N-(5-hydroxypentyl)succinimide is treated with 100 ml. of acetyl chloride for 24 hours, and the excess acetyl chloride is removed and the residue is then dissolved in 50 ml. of tetrahydrofuran. The solution is added to a stirred slurry of 10 g. of lithium aluminum hydride in 500 ml. of tetrahydrofuran. The reaction mixture is allowed to stand for six hours at room temperature and then decomposed with water as shown in Example 1 (d). The tetrahydrofuran layer is removed, concentrated and the residue is dissolved in ether. The ether solution is extracted four times with equal volumes of 2 normal hydrochloric acid. The collected hydrochloric acid layers are then made basic with dilute sodium hydroxide and extracted four times with equal volumes of ether. The ether layers are dried over anhydrous magnesium sulfate which is removed by filtration and then the ether is evaporated to give an oil. The residual oil is distilled in vacuo to give 3-(o-n-propoxyphenyl)-N-(5-hydroxypentyl) pyrrodidine, B.P. 155–160° C. at 0.4 mm.

*Example 9*

(a) To a mixture of 170 g. of sodium methoxide and 1400 ml. of dimethylformamide is added 366 g. of salicylaldehyde. The mixture is allowed to cool and 450 ml. of 2-bromopropane is added. This reaction mixture is allowed to reflux for 12 hours, filtered, and most of the solvent removed by distillation in vacuo. The residue is poured into water and extracted with equivalent volumes of benzene, then ether, then benzene and then ether. The extracts are combined and washed three times with equivalent volumes of 10% sodium hydroxide solution. The solvents are dried over anhydrous magnesium sulfate, which is removed by filtration and the solvents removed by evaporation. The residue is distilled in vacuo to give o-isopropoxybenzaldehyde, 137–145° C. at 27–32 mm.

(b) To a stirred solution of 300 g. of o-isopropoxybenzaldehyde and 226 g. of ethyl cyanoacetate in one liter of ethanol is added 2 ml. of piperidine. The reaction mixture is allowed to stand for one hour, diluted by the addition of a small amount of ice and cooled to give a precipitate. This precipitate is removed by filtration and washed with ethanol. The product is ethyl α-cyano-o-isopropoxycinnamate, M.P. 51–52° C.

(c) 166 g. of potassium cyanide is added portionwise over a period of 20 minutes to a stirred mixture of 343 g. of ethyl-α-cyano-o-isopropoxycinnamate in 500 ml. of ethanol. After complete addition, the solution is heated to reflux temperature for 10 minutes, cooled and diluted with one liter of water. Upon acidification to Congo red with concentrated hydrochloric acid an oil precipitates. This oily product is harvested by decantation and refluxed with 1.4 liters of concentrated hydrochloric acid for nine hours. The solution is cooled, filtered and the filter cake dissolved in a solution of 100 g. of sodium hydroxide in one liter of water. This solution is acidified to Congo red with concentrated hydrochloric acid and the precipitate which forms is removed by decantation.

(d) The resulting precipitate, o-isopropoxyphenylsuccinic acid, is added portionwise to a solution of 70 g. of 5-amino-1-pentanol in 100 ml. of water, and the mixture is placed in a distillation apparatus and gradually heated to 240° C. The distillate is collected and discarded, and the residue is distilled in vacuo. The product is α-(o-isopropoxyphenyl) - N - (5 - hydroxypentyl)succinimide, B.P. 235° C. at 0.3 mm.

(e) 23.3 g. of α-(o-isopropoxyphenyl)-N-(5-hydroxypentyl)succinimide is treated with 200 ml. of acetyl chloride for two days, the excess removed by distillation, and the residue is taken up in 100 ml. of dry ether. This solution is added slowly to a stirred mixture of 10 g. of lithium aluminum hydride in 500 ml. of dry ether. Following complete addition, the solution is stirred at room temperature for six hours. The reaction is decomposed and isolated as shown in Example 1 (d). The resulting oil is distilled in vacuo to give 3-(o-isopropoxyphenyl)-N-(5-hydroxypentyl)pyrrolidine, B.P. 173–175° C. at 0.1 mm.

Example 10

(a) 50.4 g. of o-isopropoxyphenylsuccinic acid, 150 ml. of water and 6 g. of 71% aqueous ethylamine are throughly mixed and placed in a distillation apparatus. The reaction mixture is gradually heated to 240° C. with the distillate being collected and discarded. The residue is then distilled in vacuo to give α-(o-isopropoxyphenyl)-N-ethylsuccinimide, B.P. 140–145° C. at 0.2 mm.

(b) 7.3 g. of α-(o-isopropoxyphenyl)-N-ethylsuccinimide is dissolved in 200 ml. of dry ether and slowly added to stirred slurry of 20 g. of lithium aluminum hydride in one liter of dry ether. Following complete addition, the reaction mixture is refluxed for eight hours and then decomposed with water and extracted as in Example 1 (d). The residue is distilled in vacuo to give 3-(o-isopropoxyphenyl)-N-ethylpyrrolidine, B.P. 95–98° C. at 0.5 mm.

Example 11

(a) 50 g. of o-isopropoxyphenylsuccinic acid is added to a mixture of 75 g. of propylamine and 50 ml. of water. The mixture is placed in a distillation apparatus and gradually heated until the bath temperature is 240° C. The distillate is collected and discarded and the residue is then distilled in vacuo. The product is α-(o-isopropoxyphenyl)-N-propylsuccinimide, B.P. 132–142° at 0.1 mm.

(b) 30.8 g. of the α-(o-isopropoxyphenyl)-N-propylsuccinimide are dissolved in 100 ml. of tetrahydrofuran. This solution is slowly added to a stirred slurry of 50 g. of lithium aluminum hydride in one liter of tetrahydrofuran. The reaction mixture is heated at reflux temperature for six hours and then decomposed and extracted as in Example 1 (d). The product is 3-(o-isopropoxyphenyl)-N-propylpyrrolidine, B.P. 110–112° C. at 0.8 mm.

Example 12

(a) A mixture of 50.4 g. of o-isopropoxyphenylsuccinic acid, 150 ml. of water and 17 g. of n-butylamine is placed in a distillation apparatus and gradually heated until the outer bath temperature is 240° C. The distillate is collected and discarded and the residue is distilled in vacuo. The product is α-(o-isopropoxyphenyl)-N-(n-butyl)succinimide, B.P. 145–150° C. at 0.3 mm.

(b) 39.5 g. of α-(o-isopropoxyphenyl)-N-(n-butyl)-succinimide are dissolved in 200 ml. of dry ether. The solution is added to a stirred slurry of 20 g. of lithium aluminum hydride and 800 ml. of dry ether. The reaction mixture is heated to reflux temperature with stirring for eight hours and then decomposed and extracted as in Example 1 (d). The extract is distilled in vacuo to give 3 - (o - isopropoxyphenyl)-N-(n-butyl)pyrrolidine, B.P. 110–113° C. at 0.5 mm.

Example 13

(a) A mixture of 50.4 g. of o-isopropoxyphenylsuccinic acid, 150 ml. of water and 20 g. of n-hexylamine is placed in a distillation flask and gradually heated until the outer bath temperature is 240° C. The distillate is collected and discarded and the residue is distilled in vacuo. The product is α-(o-isopropoxyphenyl)-N-(n-hexyl)succinimide, B.P. 153–157° C. at 0.1 mm.

(b) 31 g. of α-(o-isopropoxyphenyl)-N-(n-hexyl)succinimide are dissolved in 300 ml. of dry ether and slowly added to a stirred slurry of 20 g. of lithium aluminum hydride in one liter of dry ether. The reaction mixture is then heated for 8 hours with stirring and then is decomposed and extracted as shown in Example 1 (d). The extract is distilled in vacuo to give 3-(o-isopropoxyphenyl)-N-(n-hexyl)pyrrolidine, B.P. 120–125° C. at 0.3–0.5 mm.

Example 14

(a) To a stirred solution of 191 g. of o-n-butoxybenzaldehyde, prepared from n-bromobutane and salicylaldehyde by the method set forth in Example 9 (a), and 198 g. of ethyl cyanoacetate and 500 ml. of absolute ethanol is added 1.5 ml. of piperidine. The reaction mixture is allowed to stand for two to three hours, diluted with ice and then held below room temperature until precipitation occurs. The precipitate is removed by filtration and is dried. This precipitate is ethyl α-cyano-o-n-butoxycinnamate, M.P. 45–47° C.

(b) 18 g. of potassium cyanide is added over a period of 20 minutes to a stirred solution of 308 g. of ethyl α-cyano-o-n-butoxycinnamate and 500 ml. of absolute alcohol. The reaction mixture is heated to reflux, cooled and diluted with 500 ml. of water and acidified to Congo red. The oil which precipitates is removed by decantation and refluxed with two liters of concentrated hydrochloric acid for 42 hours. The acid solution is cooled and the oil which is obtained is recrystallized to obtain o-n-butoxyphenylsuccinic acid.

(c) 50 g. of the o-n-butoxyphenylsuccinic acid is added to a mixture of 25 g. of 5-amino-1-pentanol and 100 ml. of water. The reaction mixture is placed in a distillation apparatus and gradually heated to 250° C. The distillate is collected and discarded. The residue which is crude α - (o-n-butoxyphenyl)-N-(5-hydroxypentyl)succinimide is treated with 100 ml. of acetyl chloride for one day, the excess removed by distillation and the residue is taken up in 100 ml. of dry ether. This solution is slowly added to a stirred slurry of 40 g. of lithium aluminum hydride in dry ether and the reaction mixture heated with stirring for four to six hours and then decomposed and extracted in the manner described in Example 1 (d). The extract is distilled in vacuo to give 3-(o-n-butoxyphenyl)-N-(5-hydroxypentyl)pyrrolidine, B.P. 180–185° C. at 1.2 mm.

The corresponding isomeric 3-(o-2-butoxyphenyl)-N-(5-hydroxypentyl)pyrrolidine and 3-(o-isobutoxyphenyl)-N-(5-hydroxypentyl) pyrrolidine can be prepared in the same manner set forth in (a) through (d) starting from o-(2-butoxy)benzaldehyde and o-isobutoxybenzaldehyde, respectively.

*Example 15*

(a) To a stirred solution of 292 g. of o-allyloxybenzaldehyde and 260 g. of ethyl cyanoacetate in 700 ml. of absolute ethanol is added 1.5 ml. of piperidine. The reaction mixture is allowed to stand for two hours, then cooled and the crystals removed by filtration. The product is ethyl α-cyano-o-allyloxycinnamate, M.P. 52–54° C.

(b) 207 g. of potassium cyanide is added portionwise over a period of 20 minutes to a stirred solution of 349.5 g. of ethyl α-cyano-o-allyloxycinnamate in 700 ml. of absolute ethanol. After the addition is complete, the solution is heated for 10 minutes to reflux temperature, cooled and diluted with 1.5 liters of water. The reaction mixture is acidified to Congo red with concentrated hydrochloric acid. The oil which separates is removed by decantation and refluxed with 1.7 liters of concentrated hydrochloric acid for nine hours. The reaction mixture is cooled whereup o-allyloxyphenylsuccinic acid which precipitates as an oil is collected and dissolved in a mixture of 65 g. of 5-amino-1-pentanol and 100 ml. of water. This solution is placed in a distillation apparatus and gradually heated to 250° C. The distillate is collected and discarded and the residue is distilled in vacuo. The product is α(o-allyloxyphenyl)-N-(5-hydroxypentyl)succinimide.

(c) 43 g. of the α-(o-allyloxyphenyl)-N-(5-hydroxypentyl)succinimide is treated with 100 ml. of acetyl chloride for two days, the excess acetyl chloride is removed and the residue is dissolved in 100 ml. of dry ether. This solution is slowly added to a stirred slurry of 14 g. of lithium aluminum hydride in 800 ml. of dry ether. Following the complete addition, the reaction mixture is stirred for eight hours. The reaction mixture is then decomposed and extracted in the manner shown in Example 1 (d). The extract is distilled in vacuo to yield 3 - (o - allyloxyphenyl)-N-(5-hydroxypentyl)pyrrolidine, B.P. 170° C. at 0.4 mm.

*Example 16*

(a) To a stirred solution of 350 g. of o-n-pentyloxybenzaldehyde and 226 g. of ethyl cyanoacetate and 500 ml. of absolute ethanol is added 2 ml. of piperidine. After stirring for about two hours, the solution is cooled and diluted. A yellow oil precipitates which is separated by decantation and distilled in vacuo at 160–170° C., at 0.1 mm. The product is ethyl α-cyano-o-pentyloxycinnamate.

(b) 250 g. of potassium cyanide is added portionwise to a stirred mixture of 434.7 g. of ethyl α-cyano-o-pentyloxycinnamate and one liter of ethanol. The reaction mixture is heated to boiling and then cooled to give a yellow solid which is removed by filtration. The yellow solid is taken up in one liter of concentrated hydrochloric acid and heated for 12 hours. The reaction mixture is cooled and a yellow liquid precipitates. This yellow liquid on recrystallization from benzene yields o-n-pentyloxyphenylsuccinic acid, M.P. 89–92° C.

(c) 100 g. of o-n-pentyloxyphenylsuccinic acid is dissolved in a mixture of 75 g. of 5-amino-1-pentanol and 100 ml. of water. The mixture is placed in a distillation apparatus and gradually heated to 240° C. The distillate is discarded and the residue distilled in vacuo to give α - (o-n-pentyloxyphenyl)-N-(5-hydroxypentyl)succinimide, B.P. 139° C. at 0.15 mm.

(d) 70 g. of the α-(o-n-pentyloxyphenyl)-N-(5-hydroxypentyl)succinimide is treated with 200 ml. of acetyl chloride for sixteen hours, the excess of the acetyl chloride is removed by distillation and the residue is dissolved in 200 ml. of tetrahydrofuran. This solution is added slowly to a stirred mixture of 40 g. of lithium aluminum hydride in 800 ml. of tetrahydrofuran. The reaction mixture is heated for three to four hours with stirring and then decomposed with water and extracted as in Example 1 (d). The product is 3-(o-n-pentyloxyphenyl)-N-(5-hydroxypentyl)pyrrolidine, B.P. 168–170° C. at 0.3 mm.

*Example 17*

(a) To a stirred solution of 84 g. of 2-methoxy-5-chlorobenzaldehyde and 40 g. of ethyl cyanoacetate and 100 ml. of ethanol is added one ml. of piperidine. The reaction mixture is heated to reflux, cooled and filtered. The product is ethyl α-cyano-2-methoxy-5-chlorocinnamate, M.P. 62–65° C.

(b) 63 g. of potassium cyanide is added portionwise over a period of 20 minutes to a stirred mixture of 182.2 g. of the ethyl α-cyano-2-methoxy-5-chlorocinnamate in 200 ml. of ethanol. Following the addition, the mixture is heated to reflux, cooled and diluted with one volume of water. A low melting solid precipitates and this solid is removed by filtration. The solid is suspended in 750 ml. of concentrated hydrochloric acid and refluxed for 24 hours. The reaction mixture is cooled and the oil which precipitates is dissolved in alkali and reprecipitated to yield 2-methoxy-5-chlorophenylsuccinic acid, M.P. 165–168° C.

(c) 100 g. of the 2-methoxy-5-chlorophenylsuccinic acid is added to a mixture of 75 g. of 5-amino-1-pentanol in 100 ml. of water. The mixture is placed in a distillation apparatus and gradually heated until the temperature of the outer bath becomes 250° C. The distillate is collected and discarded, and the residue is crude α-(2-methoxy-5-chlorophenyl)-N-5-hydroxypentylsuccinimide.

(d) 100 g. of the crude α-(2-methoxy-5-chlorophenyl)-N-(5-hydroxypentyl)succinimide is dissolved in 200 ml. of acetyl chloride for twenty-four hours. The acetyl chloride is removed by distillation and the residue is dissolved in 200 ml. of dry ether. This solution is gradually added to a stirred slurry of 40 g. of lithium aluminum hydride in two liters of dry ether. Following the complete addition, the reaction mixture is heated with stirring for eight hours and is then decomposed and extracted as in Example 1. The liquid extract is distilled in vacuo to give 3-(2-methoxy-5-chlorophenyl)-N-(5-hydroxypentyl)-pyrrolidine, B.P. 168–174° C. at 0.4 mm.

*Example 18*

(a) 100 g. of o-chlorophenylsuccinic acid is added to a mixture of 75 g. of 5-amino-1-pentanol and 100 ml. of water. The reaction mixture is placed in a distillation flask and gradually heated to 250° C. The distillate is collected and discarded and the residue is distilled in vacuo to give α-(o-chlorophenyl)-N-(5-hydroxypentyl)-succinimide, B.P. 200–220° C. at 0.5 mm.

(b) 80.5 g. of α - (o-chlorophenyl)-N-(5-hydroxypenyl)-succinimide is dissolved in 100 ml. of acetyl chloride and allowed to stand for sixteen hours at room temperature. The excess acetyl chloride is removed by distillation under vacuum and the residue is taken up in 500 ml. of dry ether. This solution is added to a stirred solution of 40 g. of lithium aluminum hydride in 2000 ml. of anhydrous ether. The reaction mixture is stirred for one hour following complete addition. The excess lithium aluminum hydride is decomposed by adding four ml. of water per 0.1 gram-mole of lithium aluminum hydride. The reaction mixture is then extracted as shown in Example 1, and the residue is distilled to give 3-(o-chlorophenyl) - N - (5 - hydroxypentyl)pyrrolidine, B.P. 140–160° C. at 0.3–0.5 mm.

Example 19

(a) One ml. of piperidine is added to a stirred mixture of 140 g. of o-bromobenzaldehyde and 150 g. of ethyl cyanoacetate in 400 ml. of absolute ethanol. The reaction mixture is stirred for two hours, cooled and filtered. The filter cake is ethyl α-cyano-o-bromocinnamate.

(b) 45 g. of potassium cyanide is added to a stirred solution of 112 g. of ethyl α-cyano-o-bromocinnamate in 300 ml. of ethanol. The reaction mixture is heated to reflux temperatures, cooled and diluted with one volume of water. The reaction mixture is acidified with hydrochloric acid to Congo red and the solid removed by decantation. The solid is then dissolved in one liter of concentrated hydrochloric acid and heated to reflux temperatures for sixteen hours. The reaction mixture is cooled and the solid is removed by filtration. The product is o-bromophenylsuccinic acid, M.P. 170° C.

(c) 50 g. of o-bromophenylsuccinic acid is dissolved in a mixture of 25 g. of 5-amino-1-pentanol and 50 ml. of water. This reaction mixture is placed in a distillation apparatus and gradually heated to 240° C. The distillate is discarded and the residue is distilled in vacuo to give α-(o-bromophenyl)-N-(5-hydroxypenyl)succinimide, B.P. 190–199° C. at 0.3 mm.

(d) A solution consisting of 54 g. of α-(o-bromophenyl)-N-(5-hydroxypentyl)succinimide in 300 ml. of tetrahydrofuran is added to a stirred slurry of 40 g. of lithium aluminum hydride in one liter of tetrahydrofuran. Following complete addition, the reaction mixture is heated with stirring for three hours. The excess lithium aluminum hydride is decomposed with water. The reaction mixture is extracted as shown in Example 1 (d). The extract is distilled in vacuo to give 3-(o-bromophenyl)-N-(5-hydroxypentyl)pyrrolidine, B.P. 160–164° C. at 1 mm.

Example 20

(a) To a stirred solution of 10 g. of o-methylmercaptobenzaldehyde [Freidlander and Lenk, Ber. 45 2083–90 (1912)] and 5.3 g. of ethyl cyanoacetate in 20 ml. of ethanol is added two drops of piperidine. The mixture is stirred for approximately two hours and then cooled. The precipitate which is ethyl α-cyano-o-methylmercaptocinnamate is removed by filtration and dried.

(b) 4.4 g. of potassium cyanide is added portionwise over a period of 20 minutes to a stirred solution of 6.2 g. of ethyl α-cyano-o-methylmercaptocinnamate in 20 ml. of ethanol. The reaction mixture is heated to reflux temperatures, cooled and diluted with 2 to 3 volumes of water. The mixture is made acid to Congo red and the oil is recovered and separated. The oily product is refluxed with 50 ml. of concentrated hydrochloric acid until solution is complete. The reaction mixture is cooled and the product is removed by filtration and dried. The product is o-methylmercaptophenylsuccinic acid.

(c) 2 g. of o-methylmercaptophenylsuccinic acid is added to a mixture of 1.5 g. of 5-amino-1-pentanol in 200 ml. of water. The mixture is placed in a distillation apparatus and gradually heated to 240° C., with the distillate being collected and discarded. The residue is distilled in vacuo to give α-o-methylmercaptophenyl-N-5-hydroxypentylsuccinimide.

(d) 2 g. of α-o-methylmercaptophenyl-N-5-hydroxypentylsuccinimide is dissolved in 20 ml. of tetrahydrofuran. This solution is gradually added to a solution of 1.5 g. of lithium aluminum hydrodie in 100 ml. of anhydrous tetrahydrofuran. The reaction mixture is warmed for three hours and then decomposed and extract as in Example 1 (d). The product is distilled in vacuo to yield 3-o-methylmercaptophenyl-1-(5-hydroxypentyl)-pyrrolidine.

Example 21

(a) 100 g. of o-methylphenylsuccinic acid is added portionwise to a mixture of 75 g. of 5-amino-1-pentanol in 100 ml. of water. The reaction mixture is placed in a distillation apparatus and gradually heated to 250° C. with the distillate being collected and discarded. The residue is then distilled in vacuo to give α-(o-methylphenyl)-N-(5-hydroxypentyl)-succinimide, B.P. 180–190° C. at 0.1 mm.

(b) 105 g. of α-(o-methylphenyl)-N-(5-hydroxypentyl)-succinimide is dissolved in 100 ml. of acetyl chloride and allowed to stand for sixteen hours. The excess acetyl chloride is taken off by distillation in vacuo and the residue is taken up 500 ml. of dry ether. This solution is slowly added to a stirred mixture of 40 g. of lithium aluminum hydride and two liters of anhydrous ether. Following complete addition, the solution is stirred for six hours and the excess lithium aluminum hydride is decomposed by adding four ml. of water per 0.1 mole of lithium aluminum hydride dropwise. The reaction mixture is then extracted as in Example 1 (d), and the residue is distilled in vacuo to give 3-(o-methylphenyl)-N-5-hydroxypentyl)-pyrrolidine, B.P. 160–165° C. at 0.5 mm.

(c) About 110 g. of 3-o-(methylphenyl)-N-(5-hydroxypentyl)pyrrolidine is dissolved in one liter of anhydrous ether. Gaseous hydrogen chloride is bubbled through the solution and a white precipitate forms. This precipitate is filtered, dried and recrystallized from a mixture of ethanol and ether. The product is 3-(o-methylphenyl) - N - (5 - hydroxypentyl)pyrrolidine, monohydrochloride, M.P. 118–120° C.

Example 22

(a) To a mixture of 428 g. of benzylamine in 1000 ml. of absolute alcohol are added, with stirring, over a period of about one hour, 344 g. of methyl acrylate. The reaction mixture is heated to 60° for 18 hours, and the alcohol removed under reduced pressure at 60° C. The product is N-benzyl-β-alanine methyl ester. This residue is taken up in 1000 ml. of dry benzene and treated with 344 g. of ethyl bromoacetate. The mixture is stirred well and allowed to stand for 16 hours at room temperature. The mixture is stirred and refluxed for two hours, cooled and the solid removed by filtration. The solid is washed well with benzene and the washings are added to the filtrate. The solution, containing N-benzyl-N-carbethoxymethyl-β-alanine methyl ester, is diluted to about 1000 ml. with dry benzene and added to a mixture of 129.6 g. of sodium methoxide in 1000 ml. of dry benzene. The resulting reaction mixture is refluxed for two hours, the alcohol being removed by azeotropic distillation as it is formed. After approximately one quarter of the solvent has been removed, stirring is stopped and the remainder of the solvent is removed by distillation in vacuo to obtain a thick residue of N-benzyl-4-carbethoxy-3-pyrrolidone. This residue is warmed with two liters of 3-normal hydrochloric acid and then refluxed for 18 hours. The reaction mixture is cooled and then made basic with sodium hydroxide and the resulting solution is cooled and extracted four times with equal volumes of ether. The ether extracts are dried over magnesium sulfate, filtered and the ether removed by distillation. The residue is distilled in vacuo to give N-benzyl-3-pyrrolidone, B.P. 98–104° C. at 0.35 to 0.42 mm.

(b) 112 g. of o-bromoanisole in 250 ml. of dry ether is added to a mixture of 8.4 g. of lithium wire covered with 150 ml. of dry ether. The reaction mixture is stirred for one hour after the addition of o-bromoanisole. To the stirred lithium reagent is added a solution of 75 g. of N-benzyl-3-pyrrolidone in 250 ml. of dry ether at a rate such that gentle refluxing occurs. The reaction mixture is then heated at a refluxing temperature for three hours, allowed to stand at room temperature for 16 hours and poured onto ice. The basic solution is extracted four times with ether and the ether extracts combined, dried and evaporated. The residue is ditilled in vacuo to give N-benzyl-3-hydroxy-3-o-methoxy-phenyl pyrrolidine, B.P. 165–170° C. at 0.09 to 0.1 mm.

(c) A solution of 21 g. of N-benzyl-3-o-methoxyphenyl-3-hydroxypyrrolidine in 150 ml. of 98–100% formic acid is heated to reflux temperatures for six hours. Approximately 80 ml. of the formic acid is removed by distillation and the residue is poured into 250 ml. of water. This aqueous solution is made basic with sodium hydroxide, cooled and extracted three times with equal volumes of ether. The ether solution is washed with 5% sodium hydroxide solution in water, then dried and evaporated. The residue is distilled in vacuo to give N-benzyl-3-o-methoxyphenyl-$\Delta^2$-pyrrolenine, B.P. 164–168° C. at 0.9 mm.

35 g. of N-benzyl-3-o-methoxyphenyl-$\Delta^2$-pyrrolenine is dissolved in 200 ml. of glacial acetic acid. 10 g. of 10% palladium on charcoal is added and the reaction mixture reduced with hydrogen under atmospheric pressure until the theoretical amount of hydrogen is taken up. The reaction mixture is filtered, the glacial acetic acid is removed by distillation in vacuo and the residue is distilled in vacuo to give 3-o-methoxyphenylpyrrolidine, B.P. 96–100° C. at 0.8 mm.

(d) Alternatively the product of (c) can be made as follows:

28.3 g. of N-benzyl-3-o-methoxyphenyl-3-hydroxypyrrolidine is dissolved in 200 ml. of glacial acetic acid. 5 g. of 10% palladium on charcoal is added and the reaction mixture is reduced with hydrogen at two atmospheres pressure. When the theoretical amount of hydrogen is taken up the reaction mixture is filtered and the residue is distilled in vacuo to remove the acetic acid and further distilled in vacuo to give 3-o-methoxyphenylpyrrolidine, B.P. 82–95° C. at 0.15 mm.

(e) To a solution of 17.7 g. of 3-o-methoxyphenyl-pyrrolidine in 200 ml. of benzene is added 9 g. of ε-carbomethoxyvaleryl chloride in 15 ml. of benzene. The reaction mixture is allowed to stand for one hour. Two volumes of ether are added and the hydrochloride is removed by filtration. The fittrate is added to a stirred slurry of 20 g. of lithium aluminum hydride in 500 ml. of dry ether. The reaction mixture is refluxed for four hours and then treated with water and extracted as in Example 1 (d). The residue or extract is distilled in vacuo to give 3-(o-methoxyphenyl)-N-(6-hydroxyhexyl)pyrrolidine, B.P. 90° C. at 0.7 mm.

The starting materials for the production of the products of the invention can be prepared by the methods of which specific embodiments are given in the foregoing examples. Thus, the α-phenyl-N-substituted succinimides can be prepared by condensing phenylsuccinic acid with an alkyl amine or hydroxyalkyl amine. Likewise, for the preparation of N-alkyl-3-phenyl-3-hydroxypyrolidines or $\Delta^2$-pyrrolenines, an arcylic acid ester is condensed with the monoalkyl amine, the resulting alkyl-β-alanine ester is condensed with a bromoacetic acid ester, the N-alkyl-N-carboalkoxymethyl alanine so obtained is cyclized with sodium alkoxide followed by saponification and decarboxylation to the N-alkyl-3-pyrrolidone which on treatment with a phenyllithium derivative yields the N-alkyl-3-phenyl-3-hydroxypyrrolidine. This latter compound can be converted by dehydration with formic acid to the N-alkyl-3-phenyl-$\Delta^2$-pyrrolenine. The 3-phenyl pyrrolidines can be prepared by reduction of the corresponding N-benzyl-3-phenyl-3-hydroxypyrrolidines produced from benzylamine and an acrylic acid ester in the same manner just mentioned for the production of the N-alkyl-3-phenyl-3-hydroxypyrrolidines.

This application is a continuation-in-part of our co-pending application Serial No. 678,046, filed August 14, 1957.

We claim:

1. A member of the class consisting of 3-phenyl pyrrolidines and acid salts thereof having in free base form the formula

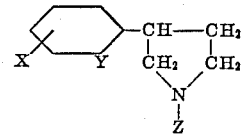

wherein X is a member of the class consisting of hydrogen and chlorine atoms and alkoxy groups containing from one to five carbon atoms, Y is a member of the class consisting of chlorine and bromine atoms and alkyl and alkoxy and alkenyloxy and alkylmercapto groups containing from one to five carbon atoms, and Z is a member of the class of alkyl and hydroxylalkyl groups containing from two to six carbon atoms, X being substituted at one of the 3- and 5-positions of the phenyl ring and Y being limited to a member of the class consisting of alkoxy and alkenyloxy and alkylmercapto groups containing from one to five carbon atoms when Z represents an alkyl group.

2. 3-(o-methoxyphenyl)-N-(5-hydroxypentyl)pyrrolidine.

3. 3-(o-ethoxyphenyl)-N-(5-hydroxypentyl)pyrrolidine.

4. 3-(o-isopropoxyphenyl)-N-(5-hydroxypentyl)pyrrolidine.

5. 3-(o-amyloxyphenyl)-N-(5-hydroxypentyl)pyrrolidine.

6. 3-(o-chlorophenyl)-N-(5-hydroxypentyl)pyrrolidine.

7. 3-(o-isopropoxyphenyl)-N-propylpyrrolidine.

8. Process for the production of 3-phenyl pyrrolidine compounds having in free base form the formula

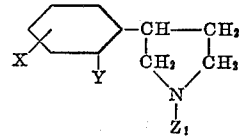

which comprises reducing with gaseous hydrogen in the presence of a hydrogenation catalyst, a member of the class of compounds having the formulas

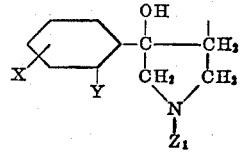

and

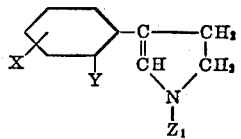

where X is a member of the class consisting of hydrogen and chlorine atoms and alkoxy groups containing from one to five carbon atoms, Y is a member of the class consisting of alkoxy and alkenyloxy and alkylmercapto groups containing from one to five carbon atoms, and $Z_1$ is an alkyl group containing from two to six carbon atoms, X being substituted at one of the 3- and 5-positions of the phenyl ring.

References Cited in the file of this patent

Leonard et al.: J. Am. Chem. Soc., vol. 73 (1951), pp. 857–858.

Miller et al.: J. Am. Chem. Soc., vol. 73 (1951), pp. 4895–4898 and 5608–5610.